United States Patent
Goto et al.

(10) Patent No.: US 7,298,934 B2
(45) Date of Patent: Nov. 20, 2007

(54) OPTICAL FIBER AND METHOD OF MEASURING POLARIZATION MODE DISPERSION OF OPTICAL FIBER

(75) Inventors: Ryuichiro Goto, Sakura (JP); Shoji Tanigawa, Sakura (JP); Shoichiro Matsuo, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/405,407

(22) Filed: Apr. 18, 2006

(65) Prior Publication Data

US 2006/0192942 A1    Aug. 31, 2006

Related U.S. Application Data (63) Continuation of application No. PCT/JP2004/015625, filed on Oct. 21, 2004.

(30) Foreign Application Priority Data

Oct. 22, 2003   (JP)   ............................ P2003-361812

(51) Int. Cl.
*G02B 6/00*    (2006.01)
*G01N 21/00*   (2006.01)
*H04J 14/02*   (2006.01)

(52) U.S. Cl. .................. 385/11; 385/122; 385/100; 385/27; 385/128; 356/73.1; 398/81

(58) Field of Classification Search ............... 385/27, 385/28, 11, 123, 122, 126, 127, 128, 100; 356/73.1; 398/81
See application file for complete search history.

(56) References Cited

U.S. PATENT DOCUMENTS

| | | | |
|---|---|---|---|
| 6,204,924 B1 * | 3/2001 | Cyr ........................... | 356/453 |
| 6,278,828 B1 | 8/2001 | Stocklein et al. ........... | 385/123 |
| 6,567,597 B2 * | 5/2003 | Sasaoka et al. ............. | 385/123 |
| 6,781,679 B1 * | 8/2004 | Richards et al. ........... | 356/73.1 |
| 7,130,496 B2 * | 10/2006 | Rogers ........................ | 385/11 |
| 2004/0184751 A1 * | 9/2004 | Chen et al. .................. | 385/123 |
| 2006/0192942 A1 * | 8/2006 | Goto et al. ................. | 356/73.1 |

FOREIGN PATENT DOCUMENTS

| | | |
|---|---|---|
| JP | 58-223032 A | 12/1983 |
| JP | 60-135648 U | 9/1985 |
| JP | 8-29293 A | 2/1996 |
| JP | 11-208998 A | 8/1999 |

(Continued)

OTHER PUBLICATIONS

J. G. Ellison, et al. "A Fully Polarimetric Optical Time-Domain Reflectometer," IEEE Photonics Technology Letters, vol. 10, No. 3, Feb. 1998.

(Continued)

*Primary Examiner*—Brian M. Healy
(74) *Attorney, Agent, or Firm*—Sughrue Mion Pllc.

(57) ABSTRACT

A method of measuring polarization mode dispersion (PMD) of an optical fiber, includes estimating PMD when an optical fiber is formed as an optical cable, from a beat length when the optical fiber is wound around a bobbin, and an average coupling length when the optical fiber is formed as the optical cable.

16 Claims, 6 Drawing Sheets

FOREIGN PATENT DOCUMENTS

| | | |
|---|---|---|
| JP | 2002-506997 A | 3/2002 |
| JP | 2002-122762 A | 4/2002 |
| JP | 2002-338140 A | 11/2002 |
| WO | WO 99/46620 A1 | 9/1999 |

OTHER PUBLICATIONS

Scott Grindstaff, Joseph Hill, Omid Daneshvar, "Extrinsic Stress Effects on Polarization Mode Dispersion in Optical Fiber Cables", International Wire & Cable Symposium Proceedings, 1993, pp. 647-654.

F. Corsi, A Galtarossa, and L. Palmieri, "Polarization Mode Dispersion Characterization of Single-Mode Optical Fiber Using Backscattering Technique", Journal of Lightwave Technology, vol. 16, No. 10, Oct. 1998, pp. 1832 to 1843.

M. Wuilpart, G. Ravet, P. Megret, and M. Blondel, "PMD measurement with a polarization-OTDR", ECOC 2002.

R. Ulrich, S.C. Rashleigh, and W. Eickhoff, "Bending-induced birefringence in single-mode fibers", Optics Letters, vol. 5, No. 6, Jun. 1980, pp. 273-275.

B.L. Heffner, "Automated Measurement of Polarization Mode Dispersion Using Jones Matrix Eigenanalysis", IEEE Photonics Technology Letters, Sep. 1992, vol. 4, No. 9, pp. 1066-1069.

Vobian, et al., "Aspects of PMD Measurements", Journal of Optical Communications, Jun. 1997, pp. 82-92, vol. 18, No. 3, Fachverlag Schiele & Schon, Berlin, DE.

* cited by examiner

OPTICAL FIBER AND METHOD OF MEASURING POLARIZATION MODE DISPERSION OF OPTICAL FIBER

CROSS-REFERENCE TO RELATED APPLICATION

This is a Continuation Application of International Application No. PCT/JP2004/015625, filed Oct. 21, 2004, which claims priority to Japanese Patent Application No. 2003-361812, filed Oct. 22, 2003. The contents of the aforementioned applications are incorporated herein by reference.

BACKGROUND OF THE INVENTION

1. Field of the Invention

The present invention relates to an optical fiber and a method of measuring polarization mode dispersion of an optical fiber.

2. Description of Related Art

In view of recent progress with respect to increasing transmission speed, and lengthening of transmission distance in optical communications, reduction of polarization mode dispersion (hereinafter, abbreviated to as "PMD") is advantageous for optical fibers, that form transmission paths.

The PMD of the optical fiber is mode dispersion caused a difference in group velocity between two orthogonal intrinsic polarization components, which propagate in the optical fiber. One source of mode dispersion is imperfections of the fiber optic, such as non-circularity of the core shape of the optical fiber, asymmetry of stress occurring in the core, etc.

There are two parameters for determining the PMD. One parameter is the magnitude of local birefringence of the optical fiber, and the other is polarization mode coupling which expresses how the direction of a birefringent axis of the optical fiber changes in the longitudinal direction of the optical fiber.

The magnitude of local birefringence of the optical fiber can be quantified by using a beat length, $L_B$. Beat length indicates a propagation distance required for polarization in the optical fiber to rotate 360 degrees and return to its initial polarization state.

Another parameter expressing the local birefringence of the optical fiber is a mode birefringence rate, B. The following Equation (1) defines the relationship between the mode birefringence rate, B, and beat length, $L_B$.

$$L_B = \frac{\lambda}{B} \quad (1)$$

In Equation (1), above, $\lambda$ equals the wavelength of light.

When the length of the optical fiber is short, polarization mode coupling can be considered negligible. Therefore, for a short fiber optic cable, the PMD reduces to the expression according to the following Equation (2). As shown below, PMD is a function of light velocity, C, and the length, L, of the optical fiber.

$$PMD = \frac{\lambda}{L_B \cdot C} \cdot L \quad (2)$$

For a short fiber optic cable, Equation (2) provides that the PMD increases in proportion to the length, L, of the optical fiber.

On the other hand, when the length of the optical fiber is long, the PMD is expressed by the following Equation (3).

$$PMD = \frac{\lambda}{L_B \cdot C} \sqrt{L \cdot L_C} \quad (3)$$

In Equation (3), above, $L_C$ is an average coupling length, which is a parameter expressing the magnitude of the polarization mode coupling. Equation (3), provides that the PMD increases in proportion to the square root of the length L of the optical fiber. As the polarization mode coupling increases, the magnitude of the average coupling length decreases. The magnitude of the polarization mode coupling is mainly determined by the distortion of the optical fiber, such as, a force applied from the outside.

When the length L of the optical fiber is shorter than $L_C$, the PMD can be expressed by using Equation (2). On the other hand, when the length L of the optical fiber is longer than $L_C$, the PMD can be expressed by using Equation (3).

It can be seen from Equations (2) and (3) that the PMD increases as beat length, $L_B$, becomes shorter, and average coupling length, $L_C$, becomes longer.

The optical fiber is typically transferred to an optical cabling process in a wound around a bobbin state, or is typically shipped and transported as an optical fiber unit. Therefore, it is desirable to be able to measure the PMD in the optical fiber that is in the wound around the bobbin state.

However, by winding the optical fiber around the bobbin, disturbances such as bending, lateral pressure, and distortion, occur in the optical fiber, thereby changing $L_B$ and $L_C$, and hence the PMD varies. Therefore, in the same optical fiber, the PMD of the optical fiber wound around the bobbin for transport, and the PMD of the optical fiber after the optical cabling process, show quite different values (for example, see Scott Grindstaff, Joseph Hill, Omid Daneshvar, "Extrinsic Stress Effects on Polarization Mode Dispersion in Optical Fiber Cables", International Wire & Cable Symposium Proceedings, 1993, pp. 647 to 654). The PMD of the optical fiber after optical cabling increases, and in some cases, exceeds an upper limit of the PMD specified by the standard, thereby causing problems.

Moreover, the optical fiber is shipped to the optical cabling process in a length of about 20 to 100 km, and at the time of optical cabling, the length of the optical fiber is cut to 1 to 10 km. Therefore, if there is a place having locally large PMD, even if the PMD of the whole length of the optical fiber before optical cabling is small, when the optical fiber is cut and formed as a cable, there may be a place where there is large PMD, which can be problematic.

SUMMARY OF THE INVENTION

The present invention takes into consideration the above situation, and an object thereof is to provide a method of measuring PMD of an optical fiber, which can estimate the PMD of the optical fiber after optical cabling, when the optical fiber was wound around a bobbin for transport.

An exemplary embodiment of the present invention provides a method of measuring polarization mode dispersion of an optical fiber, including estimating polarization mode dispersion when an optical fiber is formed as an optical cable, from a beat length when the optical fiber is wound around a bobbin, and an average coupling length when the optical fiber is formed as the optical cable.

According to another exemplary embodiment a method of measuring polarization mode dispersion of an optical fiber, includes measuring the Rayleigh scattered light intensity of the optical fiber by using a polarization-optical time domain reflectometer (P-OTDR).

In accordance with another exemplary embodiment, in a method of measuring polarization mode dispersion of an optical fiber, the resolution of the P-OTDR is made shorter than the shortest beat length estimated for the optical fiber wound around the bobbin.

In accordance with another exemplary embodiment, in a method of measuring polarization mode dispersion of an optical fiber, the optical fiber is wound around the bobbin by setting the radius, R, of the bobbin and a tension at the time of winding the optical fiber around the bobbin, so that the magnitude of birefringence of the optical fiber induced due to winding of the optical fiber around the bobbin becomes smaller than the magnitude of internal birefringence inherently held by the optical fiber.

In accordance with another exemplary embodiment, in a method of measuring polarization mode dispersion of an optical fiber, the optical fiber is wound around the bobbin by setting the radius R of the bobbin and a tension at the time of winding the optical fiber around the bobbin, so that the magnitude of birefringence of the optical fiber induced due to winding of the optical fiber around the bobbin becomes smaller than the magnitude of internal birefringence allowed in the standard for the optical fiber.

In accordance with another exemplary embodiment, in a method of measuring PMD of an optical fiber, the optical fiber is wound around the bobbin by setting the radius R of the bobbin, so that the radius, R, of the bobbin and the magnitude of internal birefringence, B, allowed in the standard for the optical fiber satisfy the following Equation (4).

$$R > \sqrt{\frac{0.25n^3|p_{11} - p_{12}|(1+v)r^2}{B'}} \quad (4)$$

(where "n" denotes a refractive index of a glass material (normally, silica glass) constituting the optical fiber, $p_{11}$ and $p_{12}$ denote Pockel's coefficients of the glass material constituting the optical fiber, v denotes a Poisson's ratio of the glass material constituting the optical fiber, and "r" denotes a radius of a glass portion of the optical fiber.)

In accordance with another exemplary embodiment, in a method of measuring PMD of an optical fiber, at the time of measurement, the measurement of the beat length is performed in a state where the tension applied to the optical fiber is temporarily reduced, because the influence of birefringence due to the lateral pressure resulting from the winding tension, and the influence of the PMD can be removed at the time of measurement. Moreover, after measurement, by returning the tension to the original tension before the measurement, problems associated with feeding the optical fiber in a subsequent manufacturing process, can be prevented.

In accordance with another exemplary embodiment, in a method of measuring PMD of an optical fiber, the bobbin has a structure capable of temporarily reducing the winding tension on the optical fiber.

In accordance with another exemplary embodiment, in a method of measuring PMD of an optical fiber, the PMD is measured in the longitudinal direction of the optical fiber.

An exemplary embodiment of the present invention further provides an optical fiber including a core and a cladding arranged around the core, wherein the PMD measured by using the above method is equal to or less than 0.1 ps/$\sqrt{\text{km}}$.

In a still another exemplary embodiment of the present invention, the optical fiber, has a beat length in a state wound around the bobbin which is equal to or longer than 15 m or further, is equal to or longer than 30 m.

An exemplary embodiment according to the present invention further provides an optical fiber, in a state in which a tension due to the bobbin is reduced after wound around the bobbin, which has a beat length equal to or longer than 15 m, or longer than 30 m.

An exemplary embodiment according to the present invention further provides an optical fiber cable in which a plurality of coated optical fibers having a protective layer around the optical fiber are arranged side by side, and the plurality of coated optical fibers are housed in a sheath.

According to the method of measuring PMD of an optical fiber in an exemplary embodiment of the present invention, the PMD of the optical fiber after optical cabling can be estimated in a state with the optical fiber wound around the bobbin.

According to the method of measuring PMD of an optical fiber in an exemplary embodiment of the present invention, it can be determined whether the PMD of the optical fiber after optical cabling is within the standard, in a state with the optical fiber wound around the bobbin.

According to the method of measuring PMD of an optical fiber in an exemplary embodiment of the present invention, since it is not necessary to prepare the optical fiber for measurement in a free state, the optical fiber can be used effectively.

According to the method of measuring PMD of an optical fiber in an exemplary embodiment of the present invention, since the polarization mode dispersion of the shipped optical fiber itself can be measured, without using the measurement result of the polarization mode dispersion of the optical fiber in the vicinity thereof, an optical fiber having higher quality can be provided.

According to the method of measuring PMD of an optical fiber in an exemplary embodiment of the present invention, since the PMD value of the optical fiber in the longitudinal direction can be measured, a place having large PMD locally can be found and removed. As a result, an optical fiber having higher quality can be provided.

DETAILED DESCRIPTION OF THE INVENTION

The method of measuring polarization mode dispersion of an optical fiber according to the present invention will be described hereunder in detail with reference to the accompanying drawings.

First, an individual study is provided as to how the beat length $L_B$ and the average coupling length $L_C$ change, by winding the optical fiber around a bobbin.

$L_B$ changes when birefringence is induced, substantially in the radial direction of the bobbin, from the influence of the bending radius, tension, or lateral pressure at the time of winding the optical fiber around the bobbin.

$L_C$ changes due to torsion of the optical fiber, or contact of optical fibers with each other, at the time of winding the optical fiber around the bobbin.

Here, the change of $L_B$ after the optical fiber is wound around the bobbin is studied from the relationship between the internal birefringence of the optical fiber, and the birefringence of the optical fiber induced from outside.

The direction of birefringence induced from outside by winding the optical fiber around the bobbin, is substantially in the radial direction of the bobbin, while the angle of the birefringent axis inside the optical fiber can take any angle.

Therefore, the average birefringence of the optical fiber when a lateral pressure is applied, can be considered to be an average when the lateral pressure is applied from various angles.

Figure 1:
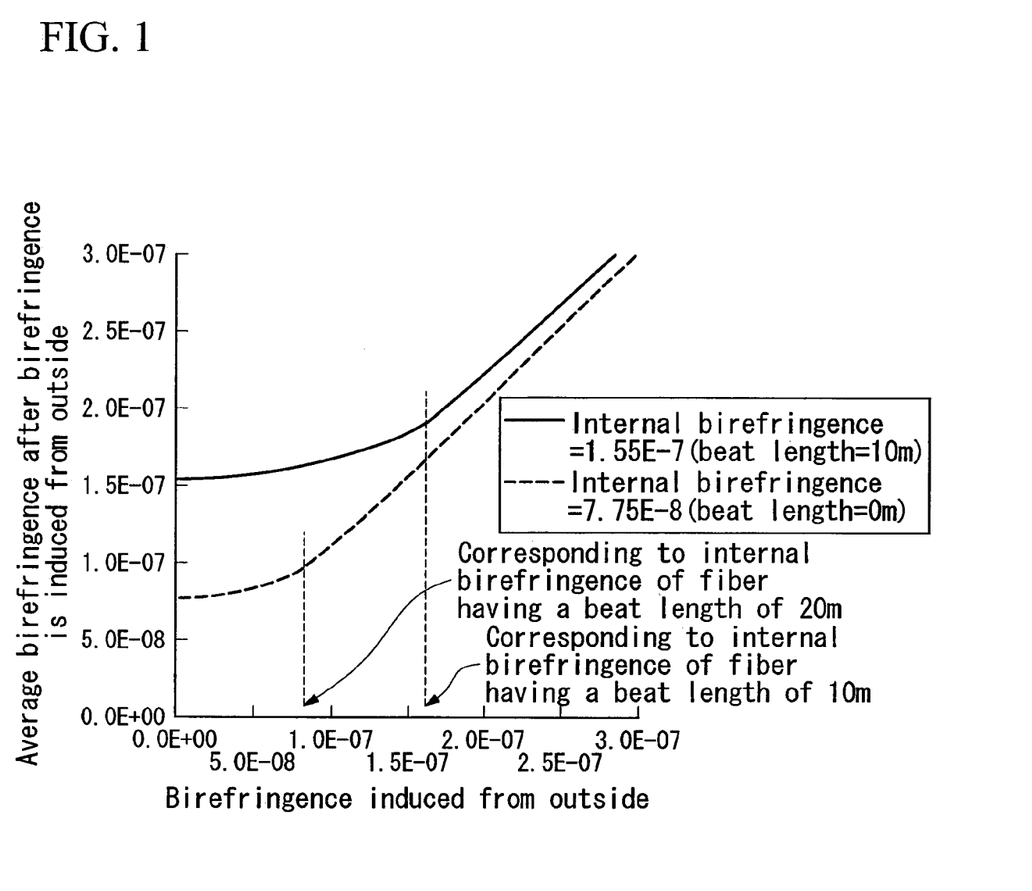
FIG. 1 is a graph showing the results of calculating the magnitude of average birefringence, at the time of applying a force from outside to two optical fibers having different internal birefringence, to induce birefringence of a different magnitude.

FIG. 1 is a graph showing the results of calculating the magnitude of the average birefringence, at the time of applying a force from outside to two optical fibers having different internal birefringence, to induce birefringence of a different magnitude.

From the results shown in FIG. 1, it is understood that when the magnitude of birefringence induced from outside is smaller than the magnitude of internal birefringence, the magnitude of the average birefringence hardly changes. On the other hand, when the magnitude of birefringence induced from outside is larger than that of the internal birefringence, the magnitude of the average birefringence becomes substantially equal to that of the magnitude of the birefringence induced from outside, and finally, the magnitude of the average birefringence becomes larger than that of the magnitude of the birefringence induced from outside. However, the magnitude of the average birefringence after birefringence is induced from outside due to lateral pressure does not become smaller than that of the internal birefringence. Therefore, by winding the optical fiber around the bobbin, the average $L_B$ inevitably becomes shorter, which causes an increase in the PMD.

On the other hand, $L_C$ after the optical fiber is wound around the bobbin becomes very short, due to torsion in the optical fiber or due to contact of the optical fibers with each other, when the optical fiber is wound around the bobbin. Therefore, a change in $L_C$ due to winding of the optical fiber around the bobbin causes a decrease in the PMD.

Accordingly, when the influence of the change in $L_C$ is larger than the influence of the change in $L_B$, the PMD decreases when the optical fiber is wound around the bobbin, and when the optical fiber is formed as an optical fiber cable and put in a free state, the PMD increases, thereby causing a problem.

An exemplary calculation of the PMD is discussed below. For example, when the length of the optical fiber is 1000 m, and this optical fiber is divided into fine sections of 0.1 mm, it is assumed that in the fine sections, the optical fiber has only linear birefringence. A change in the PMD of the optical fiber is calculated by simulation, using the Jones matrix method (refer to IEEE Photonics Technology Letters, September 1992, vol. 4, No. 9, pp. 1066 to 1069).

In a free state, when optical fibers having $L_B$ of 10 m and 20 m and $L_C$ of 30 m are wound around the bobbin, $L_C$ decreases, and birefringence is induced in the radial direction of the bobbin, and from this, how the PMD of the optical fiber changes is calculated.

Both optical fibers are set so that when the optical fibers are wound around the bobbin, $L_C$ becomes 3 m. The average coupling length used for the calculation is a typical value such that the optical fiber is put in a free state, and such that the optical fiber is wound around the bobbin. The calculation results of the PMD of the optical fiber are shown in FIG. 2.

Figure 2:
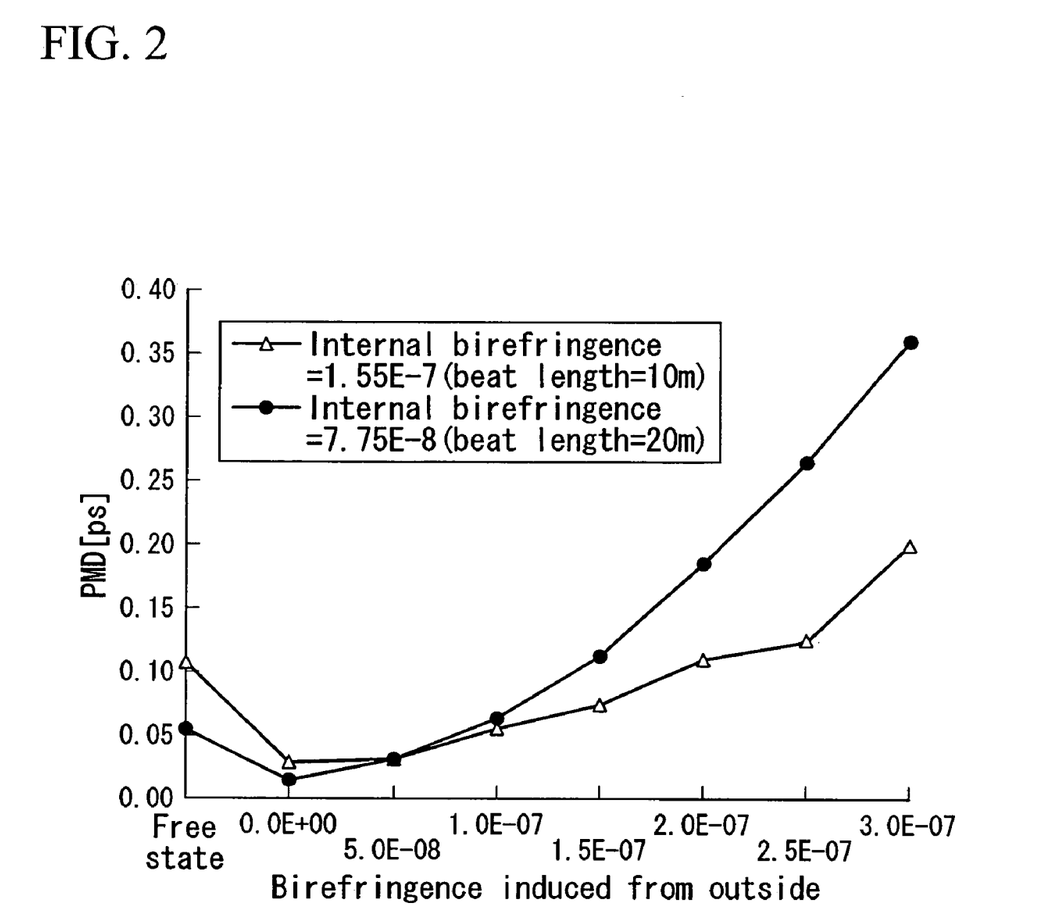
FIG. 2 is a graph showing calculation results of PMD of an optical fiber.

From the results shown in FIG. 2, it is understood that when the optical fiber is wound around the bobbin, and when the magnitude of birefringence induced from outside forces is small, the PMD of the optical fiber wound around the bobbin becomes smaller than that of the optical fiber in the free state.

It is also understood that when $L_B$ of the optical fibers in the free state is different, the magnitude of the change in the PMD with respect to the magnitude of birefringence induced from outside becomes different. Therefore, when the optical fiber is put in the free state, though the PMD is different, the PMD of both optical fibers may take the same value, according to the magnitude of birefringence induced from outside. If birefringence larger than that is induced, the magnitude correlation of the PMD of the two optical fibers is reversed to that of optical fibers in the free state. That is, the PMD of the optical fiber in the free state cannot be estimated only by measuring the PMD of the optical fiber wound around the bobbin.

Since the optical fiber cable has such a structure that an external force applied to the optical fiber is made as small as possible, the PMD of the optical fiber after optical cabling is substantially the same as that of the optical fiber in the free state. The PMD of the optical fiber after optical cabling cannot be estimated only by measuring the PMD of the optical fiber wound around the bobbin.

However, it has been found that if $L_B$ of the optical fiber wound around the bobbin is obtained, $L_B$ of the optical fiber after optical cabling does not become shorter than the $L_B$ of the optical fiber wound around the bobbin. Therefore, by obtaining $L_C$ of the optical fiber after optical cabling, the PMD of the optical fiber after optical cabling can be estimated by using Equation (2), shown again, below.

$$PMD = \frac{\lambda}{L_B \cdot C} \cdot L \qquad (2)$$

$L_C$ of the optical fiber cable is determined mainly by external factors such as the structure of the optical fiber cable, and the material and the surface properties of the resin used for the optical fiber and the optical fiber cable. Therefore, by measuring $L_C$ beforehand by using the same type of optical fiber as in other optical fiber cables formed from a resin of the same material, having the same structure, and the same surface properties, $L_C$ of the optical fiber after optical cabling can be obtained, without using the specific optical fiber for actual measurement of $L_C$.

Next, a specific example of a measurement method of $L_C$ of the optical fiber after optical cabling will be described below. At first, the PMD of the optical fiber for the whole length of the optical fiber cable is measured, and then, a section of the optical fiber of about 5 m is taken out and the PMD is measured.

In a short optical fiber cable of about 5 m, it can be considered that there is no polarization mode coupling, and hence $L_B$ can be obtained by using Equation (2).

$L_C$ can be determined by using the Equation (3), from $L_B$ obtained using Equation (2), and the PMD of the optical fiber for the whole length of the optical fiber cable.

$$PMD = \frac{\lambda}{L_B \cdot C} \sqrt{L \cdot L_C} \qquad (3)$$

Accordingly, from Equations (2) and (3), the PMD after optical cabling can be estimated from $L_B$ of the optical fiber wound around the bobbin, and the previously calculated $L_C$.

Next, an exemplary method of estimating the PMD after an optical fiber cable is formed, by using a P-OTDR will be explained.

In this method, by using the P-OTDR, $L_B$ and $L_C$ can be independently measured with the optical fiber to be measured wound around the bobbin. Specifically, methods described in F. Corsi, A Galtarossa, and L. Palmieri, "Polarization Mode Dispersion Characterization of Single-Mode Optical Fiber Using Backscattering Technique", Journal of Lightwave Technology, (Vol. 16, No. 10, October 1998, pp. 1832 to 1843), and M. Wuilpart, G. Ravet, P. Megret, and M. Blondel, "PMD measurement with a polarization-OTDR", (ECOC 2002) can be used.

Figure 3:
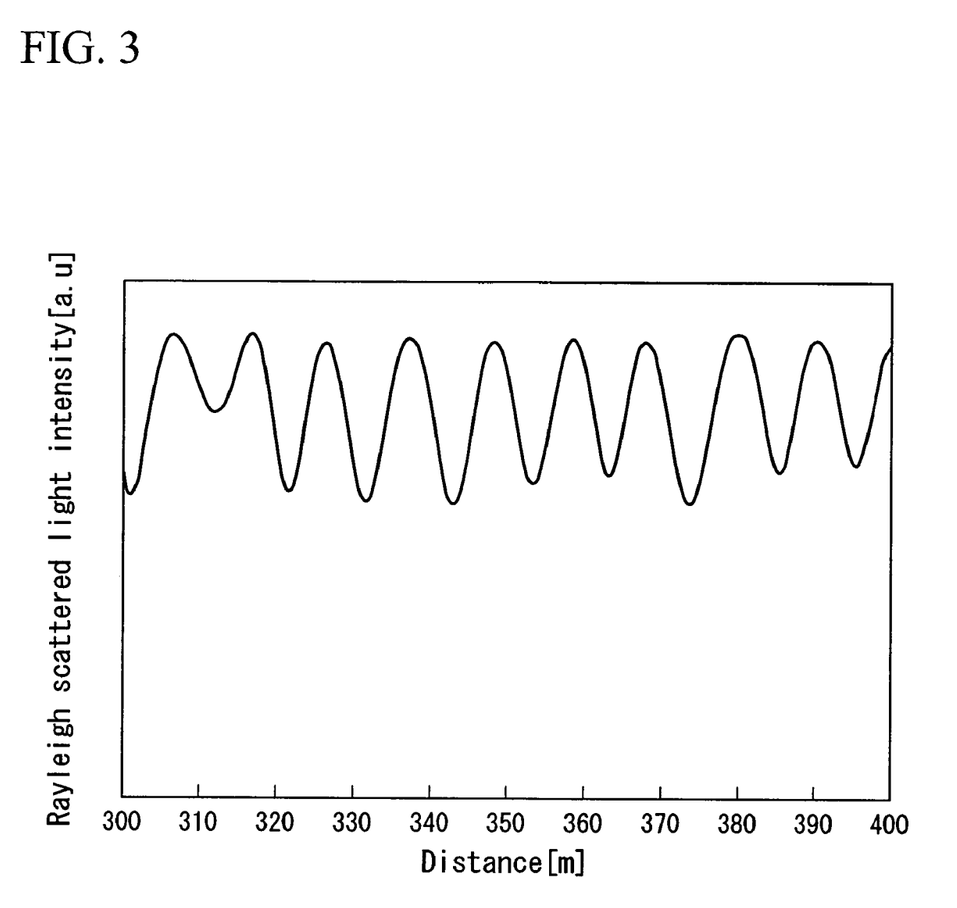
FIG. 3 is a graph showing an example of a waveform of Rayleigh scattered light intensity actually measured by using a P-OTDR.

FIG. 3 is a graph showing an example of a waveform of Rayleigh scattered light intensity actually measured by using the P-OTDR.

According to the References provided above, one calculation method of $L_B$, when there are a number of extreme values, N, of the waveform in a section length L, from which the waveform of the Rayleigh scattered light intensity is measured by using the P-OTDR, uses the following Equation (5).

$$L_B = \frac{4L}{N} \qquad (5)$$

In the case of an optical fiber having a waveform as shown in FIG. 3, since there are 19 extreme values in a 100 m section, it is understood that $L_B$ is 21 m. Thus, by measuring $L_B$ of the optical fiber wound around the bobbin by using the P-OTDR, and separately measuring $L_C$ of the optical fiber cable in the free state, the PMD of the optical fiber formed as an optical fiber cable can be estimated.

The calculation method of $L_B$ is not limited to the use of Equation (5), and other methods may be used.

In Corsi et al. and Wuilpart et al., cited above, $L_B$ and $L_C$ of the optical fiber to be measured in the free state are measured by using the P-OTDR. In contrast, in the present invention, $L_B$ is measured by winding the optical fiber around the bobbin, to estimate the PMD of the optical fiber after optical cabling.

Next the relationship between $L_B$ of the optical fiber to be measured, and the resolution of the OTDR used for the measurement of the PMD will be described.

In a single-mode fiber excluding a polarization maintaining fiber, since $L_B$ is normally 10 cm or longer, if the resolution of the OTDR is shorter than 10 cm, $L_B$ and $L_C$ can be measured independently in any single-mode fiber.

In such an application, resolution equal to or shorter than 1 cm can be obtained, for example, by using a technique referred to as photon counting OTDR. Therefore, it can be applied to any single-mode fiber other than the polarization maintaining fiber.

The measurement method of the PMD using the P-OTDR can also be applied to a multi-mode fiber, by using a device which selectively excites and receives only the one mode to be measured.

Next an exemplary optical fiber and method in which the PMD after the optical fiber is formed as an optical fiber cable, can be estimated in a state wherein the optical fiber is wound around the bobbin, will be described.

When the magnitude of birefringence of the optical fiber induced due to winding of the optical fiber around the bobbin is smaller than that of internal birefringence, then as described above, the magnitude of the birefringence of the optical fiber wound around the bobbin is substantially the same as the magnitude of the birefringence of the optical fiber after optical cabling.

Therefore, $L_B$ of the optical fiber measured in the state wound around the bobbin is substantially equal to $L_B$ of the optical fiber after optical cabling. Accordingly, an optical fiber can be provided, in which the PMD of the optical fiber after optical cabling can be estimated by measuring $L_C$ of the optical fiber cable beforehand using the same type of optical fiber.

$L_C$ after cabling is mainly determined by the internal birefringence of the optical fiber, and the external force induced due to the structure of the optical fiber cable. In many cases, $L_C$ can be assumed to be constant regardless of $L_B$. However, when $L_B$ is short, that is, when the internal birefringence of the optical fiber is large, then even if an external force is applied to the optical fiber, polarization mode coupling is hardly induced. Hence, there is a case in which $L_C$ cannot be regarded as constant. Even in this case, by obtaining $L_C$ as a function of $L_B$, an exemplary method according to the present invention can be applied.

Japanese Unexamined Patent Application, First Publication No. H11-208998, (hereafter, "JP '998") discloses a method of winding an optical fiber so that the PMD of the optical fiber wound around the bobbin matches with the PMD of the optical fiber in the free state. As described above, however, the PMD of the optical fiber wound around the bobbin changes due to the internal birefringence of the optical fiber in the free state. Therefore, in the method of JP '998, the desired winding method cannot be determined unless the internal birefringence of the optical fiber in the free state is known beforehand. Therefore, when $L_B$ is different for each optical fiber, actually used in the manufacturing process, then the effect thereof is smaller than that obtained by the present invention.

Next an exemplary optical fiber and method in which it can be determined whether the PMD standard of the optical fiber is satisfied after optical cabling, in a state wound around the bobbin, will be described.

When the magnitude of the birefringence induced by winding the optical fiber around the bobbin is smaller than the internal birefringence allowed in the standard for the optical fiber, then the birefringence after optical cabling is smaller than the internal birefringence allowed in the standard for the optical fiber. Therefore, by measuring the magnitude of the induced birefringence, and the magnitude of the internal birefringence allowed in the standard for the optical fiber, in a state with the optical fiber wound around the bobbin, it can be determined whether the optical fiber satisfies the PMD standard after optical cabling.

The maximum value of the internal birefringence allowed in the standard for the optical fiber can be calculated from a predetermined upper limit of the PMD, and the average coupling length of the optical fiber cable, by using Equations (1) and (3), above.

Next an exemplary radius of a bobbin and method, which can determine whether the optical fiber satisfies the PMD standard of the optical fiber in an optical fiber cable after optical cabling, in a state with the optical fiber wound around the bobbin will be described.

According to R. Ulrich, S. C. Rashleigh, and W. Eickhoff, "Bending-induced birefringence in single-mode fibers", Optics Letters, (Vol. 5, No. 6, June 1980, pp. 273 to 275), birefringence, B, induced by bending at the time of winding the optical fiber around the bobbin is expressed by the following Equation (6). B is calculated according to Equation (6), from a refractive index "n" of the optical fiber, Pockels coefficients $p_{11}$ and $p_{12}$, Poisson's ratio v, a radius "r" of the optical fiber, and a radius, R, of the bobbin.

$$B = 0.25n^3|p_{11} - p_{12}|(1+v)\frac{r^2}{R^2} \quad (6)$$

Equation (6) provides that if the magnitude B of the birefringence induced by bending of the optical fiber is smaller than the magnitude of the internal birefringence allowed in the standard for the optical fiber, it can be determined whether the optical fiber satisfies the PMD standard after optical cabling, in the measurement with the optical fiber wound around the bobbin.

Accordingly, it is preferable that the radius R of the bobbin satisfies the relationship in Equation (4), shown again, below.

$$R > \sqrt{\frac{0.25n^3|p_{11} - p_{12}|(1+v)r^2}{B'}} \quad (4)$$

Here, B' denotes the maximum value of the magnitude of the internal birefringence allowed in the standard for the optical fiber, and can be calculated from the predetermined upper limit of the PMD, and the average coupling length of the optical fiber cable, by using Equations (1) and (3).

Here, if the bobbin has a structure capable of temporarily reducing the tension applied to the optical fiber, then the influence of the birefringence generated inside of the optical fiber due to the tension can be removed.

According to an exemplary embodiment, the distribution of PMD is estimated in the longitudinal direction of the optical fiber.

Previously measurement of the beat length was associated with cutting the optical fiber. According to an exemplary method of the present invention, calculation of the PMD for an optical cable can be measured before the cabling process.

Moreover, in the present invention, since the beat length can be measured in the longitudinal direction of the optical fiber, then even if there is an intermediate place in the fiber where the beat length is short, the place can be determined. Then, by using an exemplary method of the present invention, and first determining the place where the beat length of the optical fiber is short, the cause of shortage can be specified and the manufacturing process can be improved. As a result, even after the optical fiber is divided in the optical cabling process, an optical fiber which provides a favorable PMD in the whole optical fiber cable can be selected.

In 40 Gb/s transmission, a PMD of the optical fiber equal to or less than 0.1 ps/$\sqrt{\text{km}}$ is desirable. Moreover, since the transmission path is formed of a plurality of optical fibers, it is required at least as the whole transmission path, that the PMD be equal to or less than 0.1 ps/$\sqrt{\text{km}}$. By using combinations of optical fibers and optical fiber cables having various structures, and by using an exemplary method of the present invention, optical fibers having a beat length of 15 m or longer after optical cabling can be connected to form one transmission path, the PMD can be set to 0.1 ps/$\sqrt{\text{km}}$ or less as the whole transmission path. For optical fibers having a beat length of 30 m or longer after optical cabling, the PMD is 0.1 ps/$\sqrt{\text{km}}$ or less in all individual optical fibers. Accordingly, a beat length, measured by using the method of the present invention, equal to or longer than 15 m, or equal to or longer than 30 m is advantageous.

Hereunder the present invention will be more particularly described and the efficacy thereof more particularly shown by summarizing specific test examples carried out in accordance with the present invention. In a first example, an optical fiber to be measured before cabling, was wound in a length of 3000 m around a bobbin having a diameter of 300 mm at a tension of 20 gf. When the magnitude of the internal birefringence of the optical fiber to be measured was measured, $L_B$ was 30 m.

On the other hand, when an optical fiber cable having a length of 3000 m was formed by using the same type of optical fiber, separately from the optical fiber to be measured, the PMD of the optical fiber constituting the optical fiber cable was 0.05 ps/$\sqrt{\text{km}}$, and $L_B$ was 30 m. Consequently, it could be estimated that $L_C$ after forming an optical fiber cable by using the optical fiber to be measured was about 85 m, using Equation (3).

From the above result, the PMD after forming a cable by the optical fiber to be measured is estimated at 0.05 ps/$\sqrt{\text{km}}$. When the optical fiber to be measured was actually used to form an optical fiber cable, the PMD was measured at 0.05 ps/$\sqrt{\text{km}}$.

In a second example, an optical fiber to be measured before cabling was wound in a length of 3000 m around a bobbin having a diameter of 300 mm at a tension of 20 gf. When $L_B$ was measured by a measurement using the P-OTDR, $L_B$ was 25 m.

On the other hand, when an optical fiber cable having a length of 3000 m was formed by using the same type of optical fiber, separately from the optical fiber to be measured, the PMD of the optical fiber constituting the optical fiber cable was 0.07 ps/$\sqrt{\text{km}}$, and $L_B$ was 20 m. Consequently, it could be found that $L_C$ after forming an optical fiber cable by using the optical fiber to be measured was approximately 73 m, using Equation (3).

From the above result, it could be estimated that the PMD after forming a cable by the optical fiber to be measured was 0.06 ps/$\sqrt{km}$. When the optical fiber to be measured was actually used to form an optical fiber cable, the PMD was measured at 0.06 ps/$\sqrt{km}$.

In a third example, an optical fiber to be measured was wound in a length of 3000 m around a bobbin having a diameter of 300 mm at a tension of 20 gf. When the P-OTDR measurement was carried out by using an OTDR having a resolution of 2 m, the waveform as shown in FIG. 3 required for measuring $L_B$ could not be observed. However, when the P-OTDR measurement was carried out by using an OTDR having a resolution of 1 cm, the waveform as shown in FIG. 3 could be observed, and it was found that $L_B$ was 1.2 m.

On the other hand, when an optical fiber cable having a length of 3000 m was formed by using the same type of optical fiber, separately from the optical fiber to be measured, the PMD was 1.0 ps/$\sqrt{km}$, and $L_B$ was 2.0 m. Consequently, it could be found that $L_C$ after forming an optical fiber cable by using the optical fiber to be measured was about 150 m, from the above Equation (3).

From the above result, it could be estimated that the PMD after forming a cable by the optical fiber to be measured was 1.67 ps/$\sqrt{km}$. When the optical fiber to be measured was actually used to form an optical fiber cable, it was found that the PMD measured at 1.60 ps/$\sqrt{km}$, and that the PMD could be estimated accurately.

In a fourth example, 3000 m of an optical fiber was prepared, which was the same type as that used in the first example, and had $L_B$ of 30 m in a state where birefringence was not induced by an external force, and this optical fiber was wound around a bobbin having a diameter of 300 mm at a tension of 20 gf.

After winding the optical fiber around the bobbin, when $L_B$ was measured by the P-OTDR, $L_B$ was 30 m. When the optical fiber was wound around the same bobbin at a tension of 70 gf, $L_B$ measured was 16 m, which was shorter than that for in a state where birefringence was not induced by an external force.

When the same optical fiber cable as in the first example was formed by this optical fiber, $L_C$ was 85 m. Therefore, it could be estimated that the PMD of the optical fiber after optical cabling was 0.05 ps/$\sqrt{km}$, when the optical fiber was wound around the bobbin at a tension of 20 gf. Moreover, it could be estimated that the PMD of the optical fiber after optical cabling was 0.1 ps/$\sqrt{km}$, when the optical fiber was wound around the bobbin at a tension of 70 gf.

The PMD after forming cables, respectively, by these two optical fibers were measured at 0.05 ps/$\sqrt{km}$ in both cases, and the PMD could be accurately estimated from the beat length when the optical fiber was wound around the bobbin at a tension of 20 gf. However, the PMD could not be estimated from the beat length when the optical fiber was wound around the bobbin at a tension of 70 gf.

In a fifth example, for 40 Gb/s transmission, it is desirable that the PMD of an optical fiber of an optical fiber cable be equal to or less than 0.1 ps/$\sqrt{km}$. When the same type of optical fiber cable as in the first example is formed by using the same type of optical fiber as in the first example, since $L_C$ of the optical fiber cable is about 85 m, then according to Equation (3), if $L_B$ at the time of optical cabling is longer than 15 m, a PMD equal to or less than 0.1 ps/$\sqrt{km}$ can be achieved.

An optical fiber of the same type as that mentioned in the first example and having a length of 3000 m was prepared. Then when this optical fiber was wound around a bobbin having a diameter of 300 mm at a tension of 20 gf, and $L_B$ was measured by using the P-OTDR, it was found that $L_B$ was 20 m. Next, when this optical fiber was wound around a bobbin having a diameter of 150 mm at a tension of 70 gf, and $L_B$ was measured by using the P-OTDR, it was found that $L_B$ was 10 m.

Moreover, when the optical fiber was used to form optical fiber cables, the PMD was measured at 0.06 ps/$\sqrt{km}$ for both cases, which was less than 0.1 ps/$\sqrt{km}$.

In summary, when the optical fiber was wound around the bobbin having a diameter of 300 mm at a tension of 20 gf, the magnitude of the birefringence induced by winding the optical fiber around the bobbin was smaller than the magnitude of the internal birefringence allowed in the standard for the optical fiber. Therefore it could be confirmed that the PMD standard could be satisfied after optical cabling, in the state where the optical fiber was wound around the bobbin. However, when the optical fiber was wound around the bobbin having a diameter of 150 mm at a tension of 70 gf, it could not be confirmed that the PMD standard could be satisfied after optical cabling, in the state where the optical fiber was wound around the bobbin.

In a sixth example, if the same type of optical fiber cable as in the first example is formed by using the same type of optical fiber as in the first example, since $L_C$ of the optical fiber cable is about 85 m, then according to Equation (3), it is found that if $L_B$ at the time of winding the optical fiber around the bobbin is longer than 15 m, a PMD equal to or less than 0.1 ps/$\sqrt{km}$ can be achieved, at the time of optical cabling. Here, according to Equations (1) and (6), the radius of the bobbin making $L_B$ 15 m is about 0.07 m for a wavelength of 1.55 μm. To calculate this value, a wavelength of 1.55 μm, an n=1.444, a $p_{11}$=0.1486, a $p_{12}$=0.2959, and a ν=0.186 were used. These values are those of synthetic quartz for a wavelength of 1.55 μm, and since members constituting the optical fiber are mainly synthetic quartz, these values are appropriate. Moreover, it is assumed that r=62.5×10$^{-6}$ m, and the influence of a fiber coating is considered negligible and hence not accounted for.

Accordingly, when the optical fiber was wound around a bobbin having a radius of 0.07 m or larger, it could be confirmed that the PMD of the optical fiber after optical cabling became equal to or less than 0.1 ps/$\sqrt{km}$, if $L_B$ at that time was equal to or longer than 15 m.

On the other hand, when the optical fiber was wound around a bobbin having a radius smaller than 0.07 m, $L_B$ became shorter than 15 m under the influence of birefringence induced by bending. Therefore, in the state where the optical fiber was wound around the bobbin, it could not be confirmed whether the PMD after optical cabling became 0.1 ps/$\sqrt{km}$ or less.

An optical fiber of the same type as that mentioned in Example 1 and having a length of 3000 m was prepared. Then when this optical fiber was wound around a bobbin having a diameter of 300 mm at a tension of 20 gf, and $L_B$ was measured by using the P-OTDR, it was found that $L_B$ was 20 m.

Next, when this optical fiber was wound around a bobbin having a diameter of 100 mm at a tension of 20 gf, and $L_B$ was measured by using the P-OTDR, it was found that $L_B$ was 7 m.

Moreover, when the optical fiber was used to form optical fiber cables, the PMD was measured at 0.06 ps/$\sqrt{km}$ in both cases, which was less than 0.1 ps/$\sqrt{km}$.

In summary, when the optical fiber was wound around the bobbin having a diameter of 300 mm, it could be confirmed that the PMD standard could be satisfied after optical cabling, in the state where the optical fiber was wound around the bobbin, but it could not be confirmed, when the optical fiber was wound around the bobbin having a diameter of 100 mm.

An optical fiber of the same type as that mentioned in the first example and having a length of 10000 m was prepared. When this optical fiber was wound around a bobbin having a diameter of 300 mm at a tension of 100 gf, $L_B$ was measured by using the P-OTDR, was found to be 10 m.

The bobbin around which the optical fiber was wound had a structure capable of reducing the tension. Therefore, when the tension was temporarily reduced, to perform the same measurement, it was found that $L_B$ was 25 m in a section of from 0 m to 9000 m. However $L_B$ was 10 m in a section of from 9000 m to 10000 m.

Moreover, when the optical fiber was cut into ten pieces of 1000 m, and bundled to form an optical fiber cable of ten cores, the PMD of the coated optical fiber formed by using the section of 0 m to 9000 m measured within the range of from 0.03 to 0.06 ps/$\sqrt{km}$, but in the core line using the section of 9000 to 10000 m, the PMD exceeded 0.1 ps/$\sqrt{km}$.

In other words, by having a structure capable of temporarily reducing the tension, it could be confirmed whether the PMD standard was satisfied after optical cabling, but when this tension compensating structure was not used, confirmation was not possible. After the measurement, since the tension was returned to that before the measurement, there was no problem in feeding the optical fiber in the subsequent manufacturing process. Moreover, by using the P-OTDR, the PMD in the longitudinal direction of the optical fiber could be measured.

In a seventh example, the beat length required for achieving a PMD equal to or less than 0.1 ps/$\sqrt{km}$ as the whole transmission path, and the beat length required for achieving a PMD equal to or less than 0.1 ps/$\sqrt{km}$ in an individual optical fiber cable, by using combinations of optical fibers and optical fiber cables having various structures was determined. As a result, when optical fibers having a beat length of 15 m or longer after optical cabling were coupled, a PMD equal to or less than 0.1 ps/$\sqrt{km}$ could be achieved as the whole transmission path. Moreover, with regard to an optical fiber having a beat length of 30 m or longer when used to form an optical fiber cable, the PMD was equal to or less than 0.1 ps/$\sqrt{km}$ in all individual optical fibers.

A beat length of the optical fiber in the state wound around the bobbin of 15 m or longer is desirable. Moreover, if the beat length of the optical fiber in the state wound around the bobbin is 30 m or longer, the PMD after optical cabling can be made equal to or less than 0.1 ps/$\sqrt{km}$, regardless of the type of the optical fiber cable.

Figure 4:
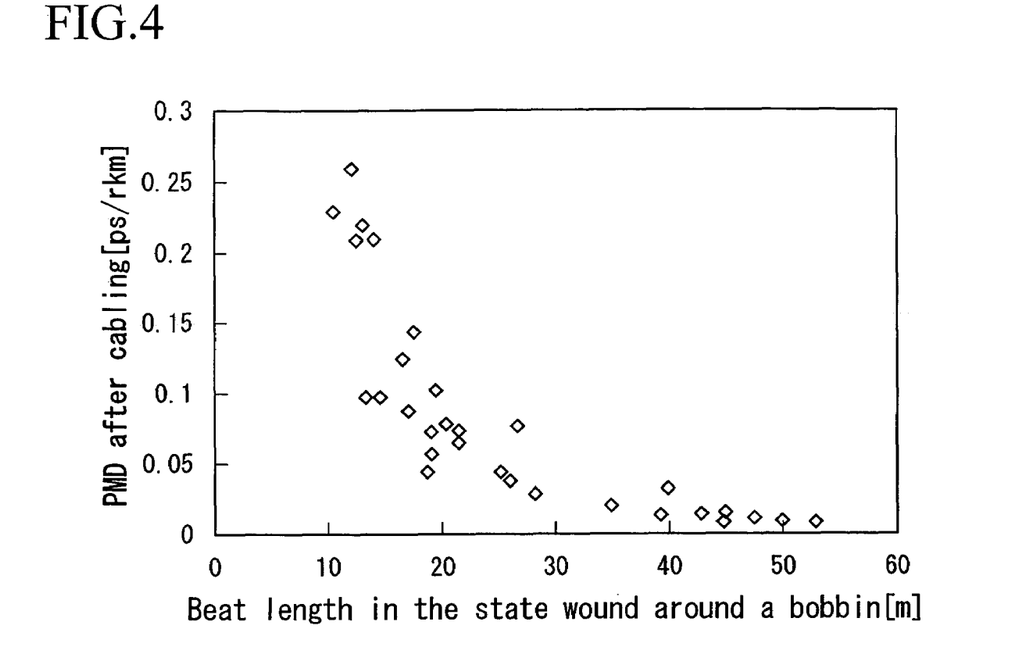
FIG. 4 is a graph showing the relationship between the beat length of an optical fiber in a state with the optical fiber wound around a bobbin, and the PMD of the optical fiber after an optical fiber cable is formed by the optical fiber.

Therefore, optical fibers having various birefringence were produced, and wound around a bobbin having a diameter of 300 mm at a tension of 40 gf in a length of 3000 m. Then the relationship between the beat length in the state wound around the bobbin, and the PMD after the optical fiber was used to form an optical fiber cable was measured. The results are shown in FIG. 4. From FIG. 4, clearly shows a relationship between the beat length in the state wound around the bobbin, and the PMD after the optical fiber was used to form an optical fiber cable. The PMD after cabling decreases with increasing beat length in the wound around a bobbin fiber state, and becomes almost independent of this beat length at beat length values greater than 30 m.

The mean value of the PMD after optical cabling of the optical fiber having the beat length of 15 m or longer in the state wound around the bobbin was 0.05 ps/$\sqrt{km}$.

All the optical fibers having a beat length of 15 m or longer in the state wound around the bobbin were connected after optical cabling to form one transmission path, and the PMD thereof was measured. The PMD of the transmission path was 0.06 ps/$\sqrt{km}$, which was smaller than 0.1 ps/$\sqrt{km}$.

Of the optical fibers used in the seventh example, the mean value of the PMD of the optical fibers having a beat length of 30 m or longer in the state wound around the bobbin after optical cabling, was 0.015 ps/$\sqrt{km}$, and there was no optical fiber cable having a PMD exceeding 0.1 ps/$\sqrt{km}$.

All the optical fibers having a beat length of 30 m or longer in the state wound around the bobbin were connected after optical cabling to form one transmission path, and the PMD thereof was measured. The PMD of the transmission path was 0.016 ps/$\sqrt{km}$, which was sufficiently smaller than 0.1 ps/$\sqrt{km}$.

Figure 5:
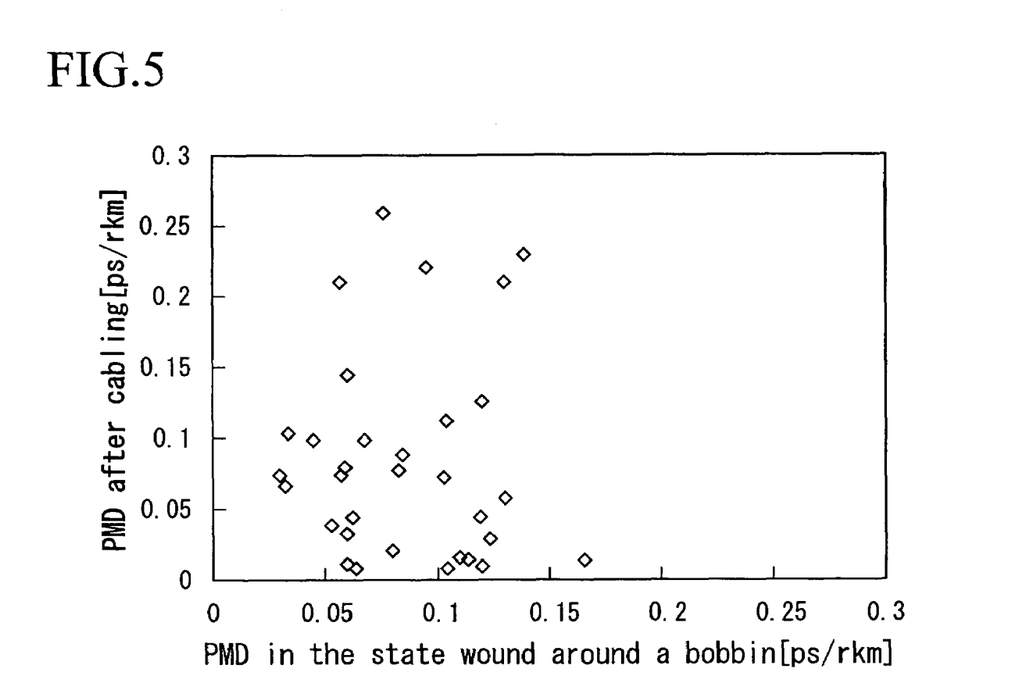
FIG. 5 is a graph showing the relationship between the PMD of the optical fiber in a state with the optical fiber wound around a bobbin, and the PMD of the optical fiber after the optical fiber cable is formed by the optical fiber.

In a final comparative example, the PMD of the optical fiber used in the seventh example was measured in the state wound around the bobbin, and the relationship between the PMD in the state wound around the bobbin, and the PMD after the optical fiber was used to form an optical fiber cable was measured. The results are shown in FIG. 5. From FIG. 5, a clear relationship cannot be found between the PMD in the state wound around the bobbin, and the PMD after the optical fiber was used to form an optical fiber cable.

The mean value of the PMD after optical cabling of the optical fibers having a PMD equal to or less than 0.1 ps/$\sqrt{km}$ in the state wound around the bobbin was 0.09 ps/$\sqrt{km}$, which was worse than the results of the seventh example, shown in FIG. 4, and was not sufficiently smaller than 0.1 ps/$\sqrt{km}$.

Figure 6:
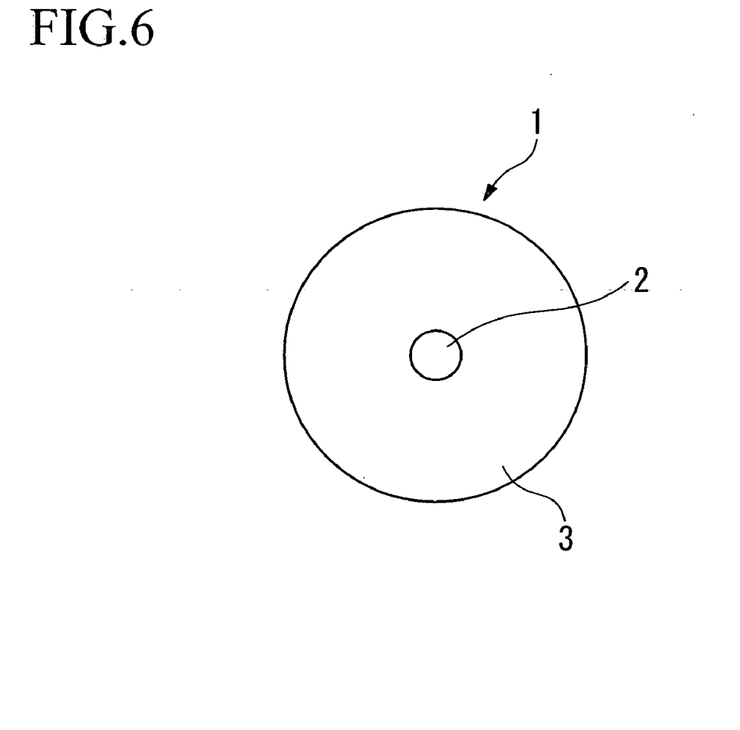
FIG. 6 is a cross-sectional view showing an example of the structure of an optical fiber.

All the optical fibers having a PMD equal to or less than 0.1 ps/$\sqrt{km}$ in the state wound around the bobbin were connected after optical cabling to form one transmission path, and the PMD thereof was measured. The PMD of the transmission path was 0.11 ps/$\sqrt{km}$, which was larger than 0.11 ps/$\sqrt{km}$ FIG. 6 is a cross-sectional view showing an example of the structure of the optical fiber according to present invention. In FIG. 6, reference symbol 1 denotes an optical fiber, reference symbol 2 denotes a core, and reference symbol 3 denotes a cladding.

Figure 7:
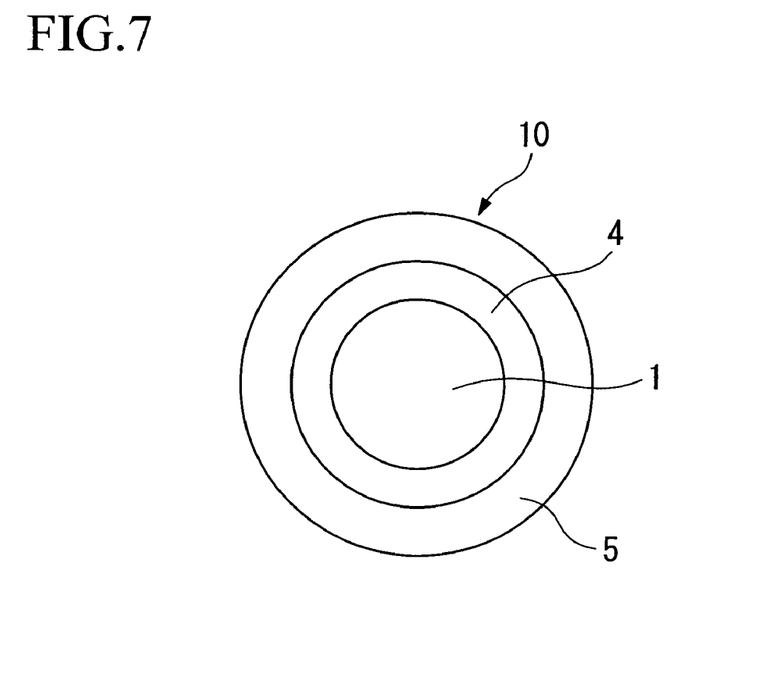
FIG. 7 is a cross-sectional view showing an example of the structure of a coated optical fiber.

FIG. 7 is a cross-sectional view showing an example of the structure of a coated optical fiber. In FIG. 7, reference symbol 1 denotes an optical fiber, reference symbol 4 denotes a primary coating, and reference symbol 5 denotes a secondary coating. The primary coating 4 and the secondary coating 5 respectively constitute a protective layer for protecting the optical fiber 1.

Figure 8:
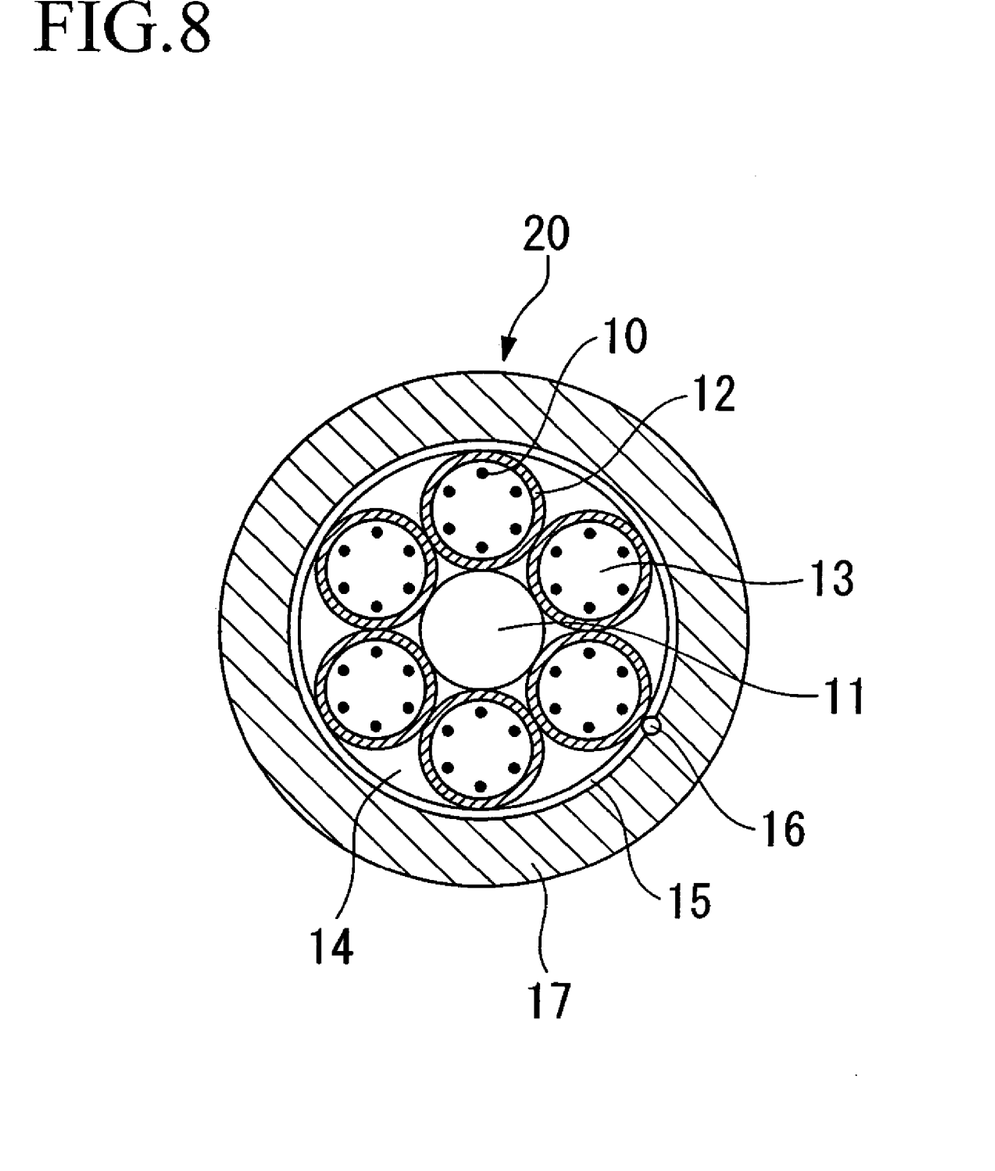
FIG. 8 is a cross-sectional view showing an example of the structure of an optical fiber cable.

FIG. 8 is a cross-sectional view showing an example of the structure of the optical fiber cable according to the present invention. In FIG. 8, reference symbol 20 denotes an optical fiber cable (loose tube type), reference symbol 10 denotes a coated optical fiber, reference symbol 11 denotes a tension member, reference symbol 12 denotes a loose tube, 13 and 14 denote a jelly, reference symbol 15 denotes a pressed winding, and reference symbol 17 denotes a sheath.

While the present invention has been particularly shown and described according to exemplary embodiments and while specific examples verifying the efficacy of the present invention are provided herein, it will be understood by those skilled in the art that various changes can be made in form or detail without departing from the spirit and scope of the invention as defined by the following claims. In summary, according to the method of measuring polarization mode dispersion of an optical fiber of the present invention, the PMD of the optical fiber after optical cabling can be estimated in a state where the optical fiber is wound around a transport bobbin.

What is claimed is:

1. A method of measuring polarization mode dispersion of an optical fiber, comprising estimating polarization mode dispersion when an optical fiber is formed as an optical cable, from a beat length when the optical fiber is wound around a bobbin, and from an average coupling length when the optical fiber is formed as the optical cable.

2. A method of measuring polarization mode dispersion of an optical fiber, comprising estimating polarization mode dispersion when an optical fiber is put in a free state, from a beat length when the optical fiber is wound around a bobbin, and from an average coupling length when the optical fiber is put in the free state.

3. A method of measuring polarization mode dispersion of an optical fiber according to claim 1 or 2, comprising measuring Rayleigh scattered light intensity of the optical fiber by using a polarization-optical time domain reflectometer (P-OTDR).

4. A method of measuring polarization mode dispersion of an optical fiber according to claim 3, further comprising setting a resolution of the P-OTDR shorter than a shortest beat length estimated for the optical fiber wound around the bobbin.

5. A method of measuring polarization mode dispersion of an optical fiber according to claim 1 or 2, further comprising setting a radius R of the bobbin, and a tension at the time of winding an optical fiber around the bobbin, so that a magnitude of birefringence of the optical fiber induced due by winding of the optical fiber around the bobbin becomes smaller than a magnitude of internal birefringence inherently held by the optical fiber, and winding the optical fiber around the bobbin.

6. A method of measuring polarization mode dispersion of an optical fiber according to claim 1 or 2, further comprising setting a radius R of the bobbin, and a tension at the time of winding an optical fiber around the bobbin, so that a magnitude of birefringence of the optical fiber induced due to winding of the optical fiber around the bobbin becomes smaller than a magnitude of internal birefringence allowed in a standard for the optical fiber, and then winding the optical fiber around the bobbin.

7. A method of measuring polarization mode dispersion of an optical fiber according to claim 1 or 2, further comprising setting a radius R of the bobbin, so that the radius of the bobbin, R, and a maximum value of a magnitude of internal birefringence, B, for the optical fiber satisfy the following Equation:

$$R > \sqrt{\frac{0.25n^3|p_{11} - p_{12}|(1+v)r^2}{B'}}$$

where "n" denotes a refractive index of the optical fiber, $p_{11}$ and $p_{12}$ denote Pockels coefficients of the optical fiber, $v$ denotes a Poisson's ratio of the optical fiber, and "r" denotes a radius of the optical fiber.

8. A method of measuring polarization mode dispersion of an optical fiber according to claim 1 or 2, further comprising measuring the beat length in a state where a tension applied to the optical fiber is temporarily reduced.

9. A method of measuring polarization mode dispersion of an optical fiber according to claim 1 or 2, wherein the bobbin has a structure capable of temporarily reducing a tension on the optical fiber.

10. A method of measuring polarization mode dispersion of an optical fiber according to claim 1 or 2, further comprising measuring a distribution of polarization mode dispersion in a longitudinal direction.

11. An optical fiber comprising a core and a cladding arranged around the core, wherein the PMD measured by using the method according to claim 1 or 2 is equal to or less than 0.1 ps/$\sqrt{\text{km}}$.

12. An optical fiber according to claim 11, wherein a beat length in a state wound around the bobbin is equal to or longer than 15 m.

13. An optical fiber according to claim 11, wherein a beat length in a state wound around the bobbin is equal to or longer than 30 m.

14. An optical fiber according to claim 11, wherein a beat length is equal to or longer than 15 m in a state in which a tension due to winding around the bobbin is temporarily reduced for measuring of the beat length.

15. An optical fiber according to claim 11, wherein a beat length is equal to or longer than 30 m in a state in which a tension due to the bobbin is reduced after the optical fiber is wound around the bobbin.

16. An optical fiber cable in which a plurality of coated optical fibers having a protective layer around an optical fiber according to claim 11, are arranged side by side, and the plurality of coated optical fibers are housed in a sheath.

* * * * *